United States Patent

Perez Freire et al.

(10) Patent No.: US 10,949,509 B2
(45) Date of Patent: Mar. 16, 2021

(54) WATERMARK EMBEDDING AND EXTRACTING METHOD FOR PROTECTING DOCUMENTS

(71) Applicant: TELEFONICA CIBERSECURITY & CLOUD TECH S.L.U., Madrid (ES)

(72) Inventors: Luis Perez Freire, Madrid (ES); Diego Perez Vieites, Madrid (ES); Pablo Pedro Perez Garcia, Madrid (ES)

(73) Assignee: TELEFONICA CIBERSECURITY & CLOUD TECH S.L.U., Madrid (ES)

( * ) Notice: Subject to any disclaimer, the term of this patent is extended or adjusted under 35 U.S.C. 154(b) by 173 days.

(21) Appl. No.: 16/171,025

(22) Filed: Oct. 25, 2018

(65) Prior Publication Data

US 2019/0130080 A1 May 2, 2019

(30) Foreign Application Priority Data

Oct. 27, 2017 (EP) ..................................... 17382720

(51) Int. Cl.
  *G06F 21/16* (2013.01)
  *G06F 16/93* (2019.01)
  *G06T 1/00* (2006.01)
  *G06F 40/103* (2020.01)

(52) U.S. Cl.
  CPC .............. *G06F 21/16* (2013.01); *G06F 16/93* (2019.01); *G06F 40/103* (2020.01); *G06T 1/005* (2013.01); *G06T 1/0028* (2013.01); *G06F 2221/0748* (2013.01); *G06T 2201/0051* (2013.01); *G06T 2201/0062* (2013.01); *G06T 2201/0065* (2013.01)

(58) Field of Classification Search
  CPC ........ G06F 21/16; G06F 16/93; G06F 40/103; G06T 1/0028; G06T 1/005
  USPC ........................................................... 726/26
  See application file for complete search history.

(56) References Cited

U.S. PATENT DOCUMENTS

| | | |
|---|---|---|
| 2005/0039021 A1 | 2/2005 | Alattar et al. |
| 2007/0014429 A1* | 1/2007 | He .................. G06T 1/0028 382/100 |
| 2011/0016388 A1 | 1/2011 | Tang et al. |

(Continued)

OTHER PUBLICATIONS

Alattar et al., Watermarking electronic text documents containing justified paragraphs and irregular line spacing, Proceedings of SPIE Jun. 22, 2004;5306:685-695.

(Continued)

*Primary Examiner* — Jacob Lipman
(74) *Attorney, Agent, or Firm* — Casimir Jones, S.C.; Peter J. Schlueter

(57) ABSTRACT

A method for watermarking documents comprising:
  identifying and locating spaces in a received original document (10) by a location analysis (110) module which distinguishes between intra-word spaces and inter-word spaces;
  minimizing an error probability of interference between intra-word spaces and inter-word spaces in the watermarked document (20) by an optimization module (111);
  encoding (113) the message (30) into codewords and encoding (114) the codewords into the watermark;
  embedding the watermark to generate (115) the watermarked document (20) by modifying the intra-word spaces and inter-word spaces of the original document (10).

6 Claims, 5 Drawing Sheets

(56) References Cited

U.S. PATENT DOCUMENTS

2014/0016814 A1* 1/2014 Baughman .............. G06F 21/16
382/100
2015/0228045 A1* 8/2015 Mehta ................... G06T 1/0064
382/103

OTHER PUBLICATIONS

Yang et al., Text Document Authentication by Integrating Inter Character and Word Spaces Watermarking, IEEE International Conference on Multimedia and Expo, Jun. 27-30, 2004, Taipei, Taiwan;2:955-958.

European Search Report for EP17382720, dated Jan. 3, 2018, 7 pages.

* cited by examiner

WATERMARK EMBEDDING AND EXTRACTING METHOD FOR PROTECTING DOCUMENTS

FIELD OF THE INVENTION

The present invention has its application in the telecommunication sector, within the field of digital information security and digital content processing, and relates to digital watermark technology.

More particularly, the present invention refers to a method for embedding a digital watermark into a document, which may be in a digital or digitalized format, including text; and a method for extracting the watermark from the watermark-embedded document even in case of distortion in the document.

BACKGROUND OF THE INVENTION

The inclusion of hidden information in a text file is a desired feature in many fields and for many different applications. On one side, hidden information embedded in a text document may be decoded by machines to enable automatic classification of documents. At the same time, such information may enable automatic validation of the authenticity, integrity and ownership of a document. Furthermore, that information—included in confidential documents—may allow their tracking, dissuade information leak or help in the identification of the responsible in a case of leak.

Information included in documents with this purpose are usually intended to be imperceptible by human beings while appreciable by computer systems, which can read and decode them. Such information inclusion is usually referred to as watermark. A watermark is an alteration of a document that may include an identifying image or pattern, such as character spacing or character deformation in the case of text, or pixel shifting in frequency or space in the case of images. The watermark may represent a code or a unique sign/signature. The watermark may be replicated in different parts/sections of the document itself, allowing to be extracted also from a portion of the original document (in case of damaged/dirty/crumpled documents). Finally, the watermark cannot be appreciated by a human inspection, while can be identified at a digital inspection, retrieving the represented code.

Many different methods exist to include watermarks into multimedia data, namely audio, video and images, for which a wide scientific literature exists describing embedding and extraction methods. Inclusion and extraction of watermarks from multimedia data, however, usually implies techniques not applicable to text documents.

Different methods are used to include information in text documents, usually implying the addition or change of the appearance of a document. The easiest methods include visible marks to in the document, such as barcodes. However, the addition of visible marks in the document may not be acceptable for various applications, either for esthetic reasons or because the watermark should be unnoticed by the user. As such, imperceptible watermarks are of great interest for text documents, where there are usually few areas to conceal a mark than in multimedia data.

For what concerns imperceptible watermarks in text documents, different techniques are available and are mainly based on one of the following three encoding methodologies: (i) special elements may be implied to embed the watermark, which are not part of the standard printing process (e.g., special inks or papers), (ii) info may be encoded in the text part of the document, through semantic or syntactic rules, i.e., altering the text content using synonyms or different capital/small letter sets, etc., or (iii) info may be encoded in modification of the document appearance, including color variations, transpositions of parts of the content, etc.

Some of the available techniques to integrate watermarks into documents are valid for paper documents, others for digital documents (a digital document is an original document created in a digital format, e.g., usually PDF), some for both formats, but all of them present limitations, including dependence on the printing and scanning process, or not resistance to printing, distortion, or limited amount of information that can be embedded in the document.

Therefore, it is highly desirable to develop a method for embedding watermarks in paper text documents and digital documents resulting resistant to distortions of the document, without needing the original document for watermark extraction and without requiring any special equipment for printing nor scanning the document.

SUMMARY OF THE INVENTION

The present invention solves the aforementioned problems and overcomes previously explained state-of-art work limitations by providing a method for embedding/extracting digital watermarks to protect documents. More particularly, a method for embedding a digital watermark encoding a message into an original document is provided. The original document may be a digital or digitalized document (a digitalized document is a scan/picture of a digital document previously printed to paper, or the conversion to a different digital format of a digital document), including text documents, both in vectorial format and pixel mapping objects. Also, the reverse method, that is, the method for extracting the message of watermarking embedded in a document, without requiring the original document, is provided.

An aspect of the present invention refers to a method for embedding watermarks to documents, which receives as input an original document and a message to obtain as output a watermarked document which has a watermark embedded, the watermark encoding the received message. The watermarking method comprises the following steps:

identifying and locating spaces in the original document by a location analysis module, the location analysis distinguishing between intra-word spaces and inter-word spaces;

minimizing an error probability of interference between intra-word spaces and inter-word spaces in the watermarked document by an optimization module;

encoding the message into codewords and encoding the codewords into the watermark;

embedding the watermark to generate the watermarked document by modifying the intra-word spaces and inter-word spaces of the original document.

Another aspect of the present invention refers to a method for extracting watermarks from documents, the method receiving as input a received document which results from eventual deformations of a watermarked document and the method comprising the following steps:

identifying and locating spaces in the received document by a location analysis module which distinguishes between intra-word spaces and inter-word spaces and obtains a vector $S'_{BW}$ corresponding to the inter-word spaces of the watermarked document;

mapping the inter-word spaces of the vector $S'_{BW}$ to symbols according to an alphabet of codewords w={$w_i$}, i=1, 2, ... Q; Q being the number of symbols of the message encoded by the watermark of the watermarked document and the symbols being univocally mapped to the codewords w;

de-packetizing the mapped symbols to obtain synchronization blocks and payload blocks of symbols;

channel decoding the payload blocks to extract the message which was encoded by the watermark, the watermark embedded into the watermarked document.

Another further aspect of the present invention refers to a computer program and a non-transitory computer-readable medium, containing computer instructions or code (stored in the non-transitory computer-readable medium) for causing processing means (of a computer processor) to perform the steps of the methods for embedding and/or extracting watermarks described before.

The present invention has a number of advantages with respect to prior art, which can be summarized as follows:

Blind recovery of the embedded watermark, i.e., the recovery of the embedded message does not require the presence of the original message.

Resilience to document distortion, such as partial disruption, printing/scanning distortions, color changing in printing/scanning process, etc.

Independence of the watermarking method to the document format (digital, digitalized or printed).

Independence of the watermarking method to the printing and scanning technology, not requiring any specific device nor technology.

Resulting solution unappreciable at human inspection, but identifiable at digital inspection.

No textual editing is required.

These and other advantages will be apparent in the light of the detailed description of the invention.

DESCRIPTION OF THE DRAWINGS

For the purpose of aiding the understanding of the characteristics of the invention, according to a preferred practical embodiment thereof and in order to complement this description, the following Figures are attached as an integral part thereof, having an illustrative and non-limiting character.

PREFERRED EMBODIMENT OF THE INVENTION

The matters defined in this detailed description are provided to assist in a comprehensive understanding of the invention. Accordingly, those of ordinary skill in the art will recognize that variation changes and modifications of the embodiments described herein can be made without departing from the scope and spirit of the invention. Also, description of well-known functions and elements are omitted for clarity and conciseness.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

Figure 1:
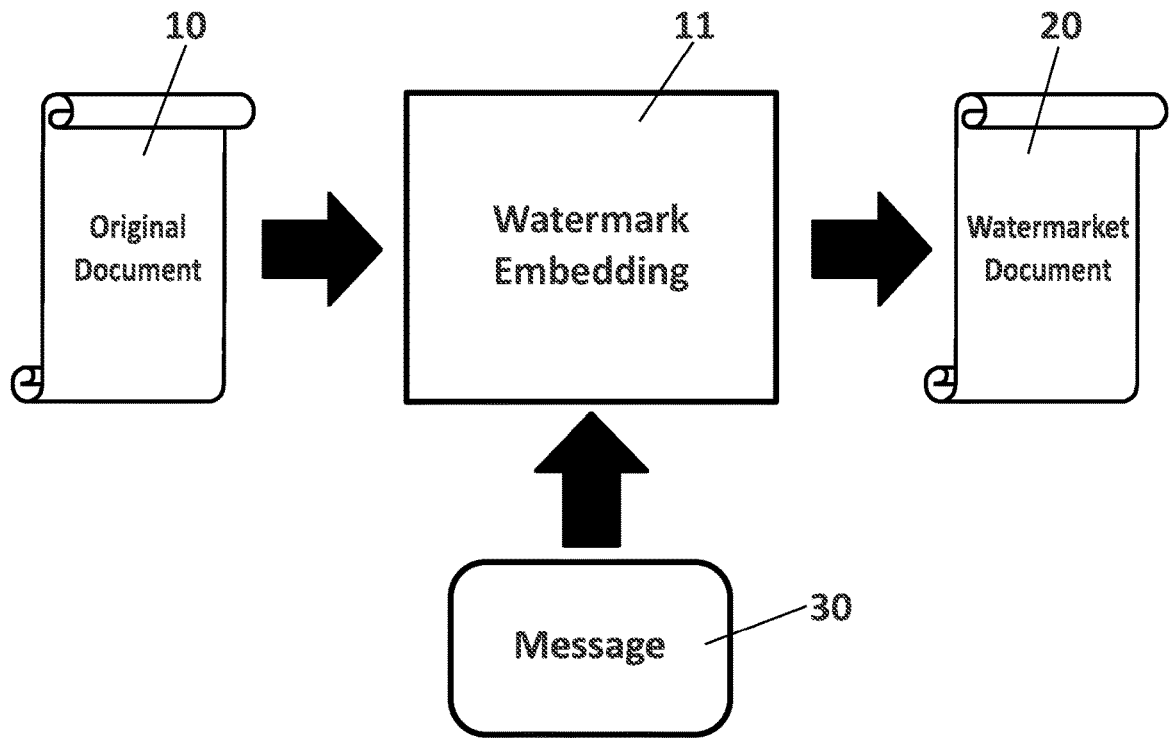
FIG. 1 shows a generic block diagram of the watermark embedding method.

FIG. 1 shows that the watermark embedding method (11) proposed here takes as input an original document (10) and a message (30) to be encoded in the watermark. The original document (10) may be a digital document or a digitalized document, including, e.g., a scanned document of a printed paper. The watermark embedding method (11) returns as output a new version of the document, the watermarked document (20), which is undistinguishable at human observation from the original document (10) but including the watermark that encodes the input message (30).

Figure 2:
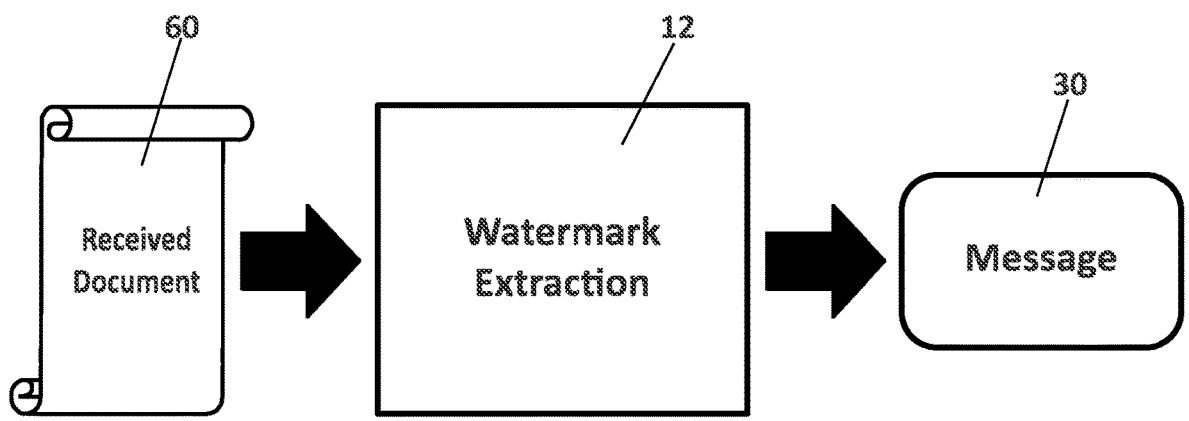
FIG. 2 shows a generic block diagram of the reverse method for watermarking extraction.

The watermark extraction method (12), shown in FIG. 2, is the reverse process of the aforementioned watermark embedding method (11) and takes as input a copy of a received document (60), which may be in a digital or digitalized format, eventually including distortion, and extracts the embedded message (30). The input element in the extraction method (12) is usually not the watermarked document (20), as the received document (60) may be different from the sent one due to distortion, noise, etc.

Figure 3:
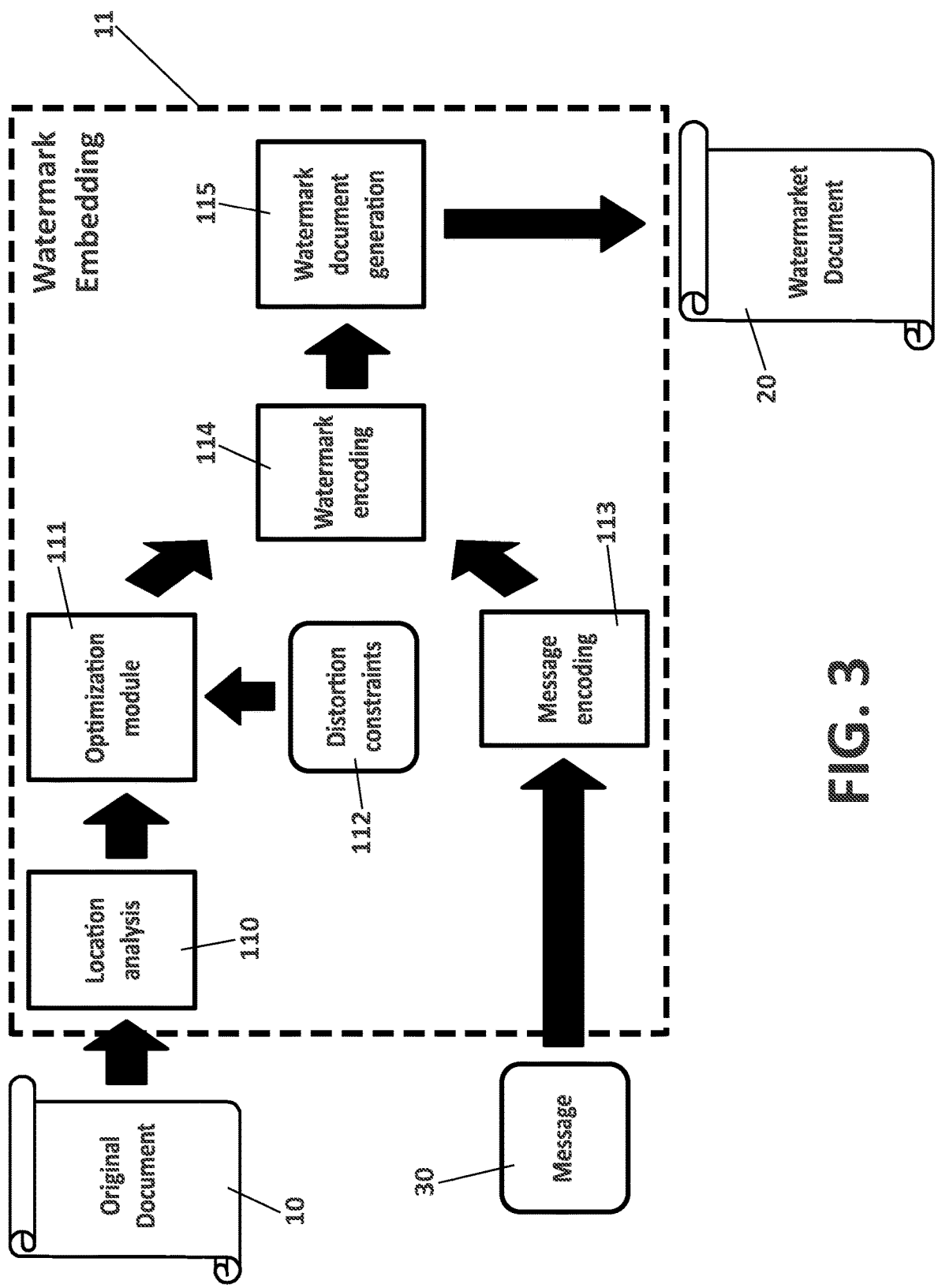
FIG. 3 shows a detailed block diagram of the watermark embedding method, according to a preferred embodiment of the invention.

The watermark embedding method (11) is divided into more detailed sub-processes in FIG. 3. The original document (10) is first submitted to a location analysis (110), which is aimed at finding and analyzing the spaces present in the text of the original document (10). After the spaces are located and analized, then the original document (10) is submitted to an optimization module (111) for minimizing the error probability in a future watermark extraction process taking into account determined distortion constraints (112). In parallel, the message (30) to be embedded in the document must be encoded (113) into codewords and the codewords encoded (114) in a watermark. Finally, the watermark is embedded in a document to generate (115) a watermarked document (20).

Figure 4:
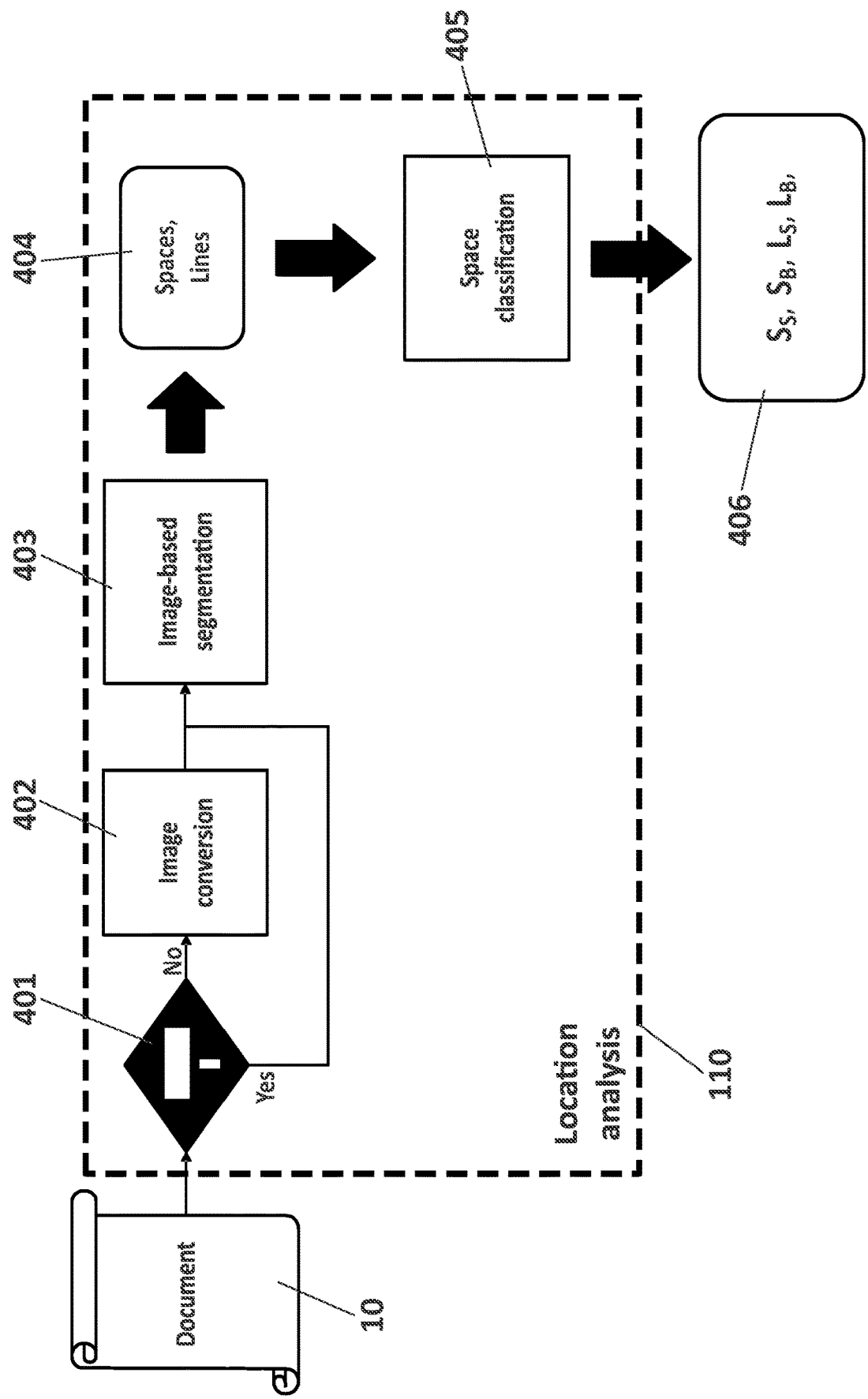
FIG. 4 shows a block diagram of the location analysis module included in the watermark embedding method shown in the previous FIG. 3, according to a possible embodiment of the invention.

The location analysis (110) consists of different steps shown in further detail in FIG. 4. First of all, it is checked (401) whether the input original document (10) is provided in a bitmap format or not. If the original document (10) is provided in a non-bitmap format, it is converted (402) into a bitmap format in order to have a common reference for the space positioning in the document, in pixels, independently of the original document (10). As a second step, an image-based segmentation (403) is performed in order to find the spaces in the document text. Image-based segmentation (403) may be performed using different techniques, including projection and clustering. Projections represent an easier method, while clustering or Optical Character Recognition, OCR, may represent valid solutions in case of non-homogeneous text background. Assuming a standard horizontal distribution of the text in a homogeneous background document, first horizontal projections of the text are performed in order to detect the text lines.

By binarizing the bitmap format document and summing the pixels in horizontal direction, the horizontal projection $P_h(r)$ is obtained as:

$$P_h(r) = \Sigma_c I(r,c)$$

where r is the r-th row, c is the c-th column, and l(r,c) is the binarized document image.

By setting a proper threshold value, the bitmap format document may be segmented in text lines, finding optimal binarization thresholds from the image histogram. Once the projections are computed, and text lines identified, each text line is segmented. For each line, its vertical projection $P_{vi}(c)$ corresponds to:

$$P_{vi}(c)=\Sigma_r l_i(r,c)$$

where, $l_i(r,c)$ is the binarized document image cropped to the i-th line.

Applying the same technique used to isolate text line using the horizontal projection $P_h(r)$, spaces in each line can be identified and measured applying a proper threshold to the vertical projection $P_{vi}(c)$.

The output (404) of the segmentation (403) is a set of space lengths and a set of their corresponding locations in the document, denoted as set S and set L respectively. The identified spaces are then classified (405) into intra-word and inter-word spaces. As the process is dealing with a bitmap document, this space classification (405) may be based on OCR—Optical Character Recognition—techniques or on a clustering algorithm by analyzing the histogram of the space lengths, S. As a result of this classification (405), the original space lengths S and locations L sets are split respectively into sets (406), $S_S$ and $S_B$, and $L_S$ and $L_B$, being the sets of the length and location of the intra-word and inter-word spaces, respectively.

As a following step, the output sets (406) of the space classification (405) are fed to an optimization process, aiming at reducing the error probability of the future watermark extraction process. In particular, in order to minimize the possible interference between inter-word and intra-word spaces in the watermark extraction process (i.e., interpreting a space of one kind for one of the other kind), the distance between the lengths of the two kinds of spaces may be increased. This operation is referred to as "host rejection". This operation introduces distortion in the document (10), referred to as $D_R$, which is regulated by a proper constraint parameter received as input, referred to as $D_{R\_MAX}$. In particular, a possible solution minimizing the error probability while keeping the distortion below $D_{R\_MAX}$ consists of taking a modified intra-word space $S^*_{si}$, for the i-th line, equal to:

$$\begin{cases} \mu(i)+\varepsilon & \text{if } S_{Si} > \mu(i)+\varepsilon \\ S_{Si} & \text{else} \end{cases}$$

where $\mu(i)$ is the average value of the length of the intra-word spaces $S_{Si}$ in the i-th line, and $\varepsilon$ is the host-rejection parameter, to be adjusted in order to obtain $D_R=D_{R\_MAX}$. $D_R$ is an indicative value of the change in the lengths of the intra-word spaces for all the lines of the document (10), i.e., $D_R=\Sigma_i|S^*_{Si}-S_{si}|$ Hence, $D_R=\Sigma_i(S_{Si}-(\mu(i)+\varepsilon))$ for $S_{Si}>\mu(i)+\varepsilon$ As $S_{Si}$ and $\mu(i)$ are known, the value of the host-rejection $\varepsilon$ is extracted and used to determine $D_R=D_{R\_MAX}$.

The effect of the above host rejection application is to reduce the largest intra-word spaces in each line, resulting hence in larger inter-word spaces. Generally, the goal is to keep the total length of each line unchanged. As such, the following condition must be satisfied:

$$\Sigma_k S^*_{Si}(k)+\Sigma_k S^*_{Bi}(k)=\Sigma_k S_{Si}(k)+\Sigma_k S_{Bi}(k)$$

being $S_{Si}(k)$ the length of the k-th intra-word space of the i-th line, $S^*_{Si}(k)$ the modified length of the same space, and, correspondingly, $S_{Bi}(k)$ and $S^*_{Bi}(k)$ the original and modified length of the k-th inter-word space of the i-th line.

Being $N_b(i)$ the number of inter-word spaces in the i-th line, the above equation may be solved using modified spaces equal to:

$$S^*_{Bi}(k)=S_{Bi}(k)+(\Sigma_k S_{Si}(k)-\Sigma_k S^*_{Si}(k))/N_b(i)$$

resulting in a homogeneous redistribution of the extra space among the inter-word spaces, which in turn results from the reduction of the intra-word spaces.

Figure 5:
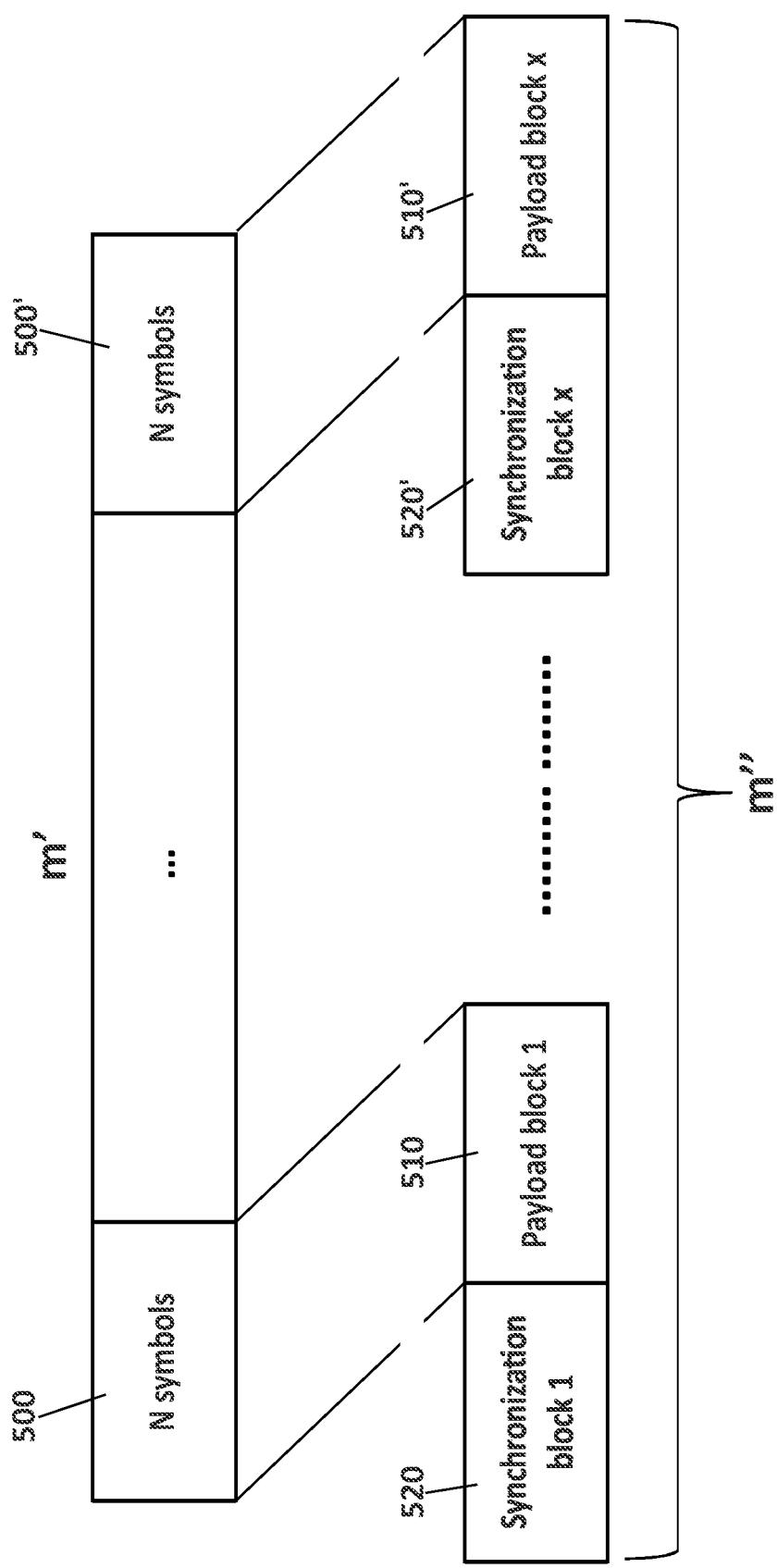
FIG. 5 shows a message packetization for the watermark embedding method of FIG. 3, according to a possible embodiment of the invention.

The message (30) to be encoded in the watermark is a sequence of bits of length K. The message (30) is encoded by an encoding module (113). As a first step, the encoding module (113) adds a channel coding to the message (30) in order to make it robust to decoding errors. This is achieved by standard forward error correction codes, resulting in a modified message (m') of length L>K, shown in FIG. 5. As a second step, the modified message (m') is divided as a sequence of symbols (500, 500') into payload blocks (510, 510') of length N. In addition, before each payload block (510, 510'), a synchronization block (520, 520') of length T is added to allow the watermark decoder to recover from synchronization errors resulting from misinterpretations of intra-word and inter-word spaces, which result from document distortions. The resulting sequence (m") has a length of L(1+T/N).

Once the encoded message has been generated, the watermarked document (20) is generated (115) through a two-step process:

1. A watermarking encoding module encodes each symbol of the encoded message into a sequence of space lengths. As a result, the document inter-word spaces $S_B^*$ are modified to the watermarked inter-word spaces $S_{BW}$.
2. The final watermarked document (20) is generated modifying the spaces in the previous document, according to the intra-word space $S_S^*$ and inter-word space $S_{BW}$ vectors.

The watermark embedding is performed in a per-packet fashion according to a secret key, resulting in a sequence of codewords $\{w_1, \ldots, w_Q\}$, being $w_i=[w_i(1), \ldots w_i(P)]$, $i=1, 2, \ldots Q$, and $w_i(k)=\pm 1$. Being the number of codewords Q equal to the number of different symbols in the encoded and packetized message, each symbol may univocally be mapped to a codeword. Then, for each symbol in the packet p(i), the following operations are performed:

1. Select a subset of P elements in $S_B^*$ of length N·L, mapped to $S^t_B$ through a secret key. The subset may include elements belonging to different lines of text.
2. Embed the selected codeword $w_t$ in the selected subset using the following formula:

$$S^t_{BW}(k)=S^t_B(k)+w_t(k)\cdot c_t(k)\cdot S^t_B(k)=S^t_B(k)(1+w_t(k)\cdot c_t(k))$$

where $c_t(k)$ is a weighting factor. Depending on the sign of the selected codeword $w_t(k)$, for the k-th inter-word space in the t-th line, the inter-word space $S^t_{BW}(k)$ of the watermarked document (20) may be longer or shorter than the original space $S^t_B(k)$.

The role of the weighting factor $c_t(k)$ is to ensure that the first and last letters of each line remain in the same position (really important, for instance, in justified texts and to avoid layout modifications in the resulting document). The weighting factor $c_t(k)$ is necessary when the number of large and short inter-word spaces in a given line is not equal. In general, this is true when $$\sum_k S'_{BW}(k) = \sum_k S'_B(k)$$

or, equivalently, $\sum_k w_i(k) \cdot c_i(k) \cdot S_{Bi}(k) = 0$ being $c_i(k)$ and $w_i(k)$ the weighting factor and the codeword component respectively for the k-th inter-word space in the i-th line, according to the mapping defined above.

As such, the above condition can be rewritten as:

$$\sum_{k \ni wi(k)=1} c_i(k) \cdot S_{Bi}(k) = \sum_{k \ni wi(k)=-1} c_i(k) \cdot S_{Bi}(k)$$

being the first term the sum of the spaces for which the coding elements is +1, weighted with the corresponding weighting factor, while the second term the sum of the spaces for which the coding elements is −1, weighted with the corresponding weighting factor. This is equivalent to:

$$c_1/c_{-1} = \sum_{k \ni wi(k)=-1} S_{Bi}(k) / \sum_{k \ni wi(k)=1} S_{Bi}(k)$$

Furthermore, if the inter-word spaces in each line are uniform, which is the common case, then $S_{Bi}(k) = S_B$ and the condition becomes: $c_1/c_{-1} = N_{-1}/N_1$, being $N_{-1}$ the number of '−1' coding elements and $N_1$ the number of '1' coding elements, in $w_i(k)$ for the i-th line.

The generation of the watermarked document (20) concludes hence by modifying the spaces of the original document according to the $S_S^*$ and $S_{BW}$ sets.

Figure 6:
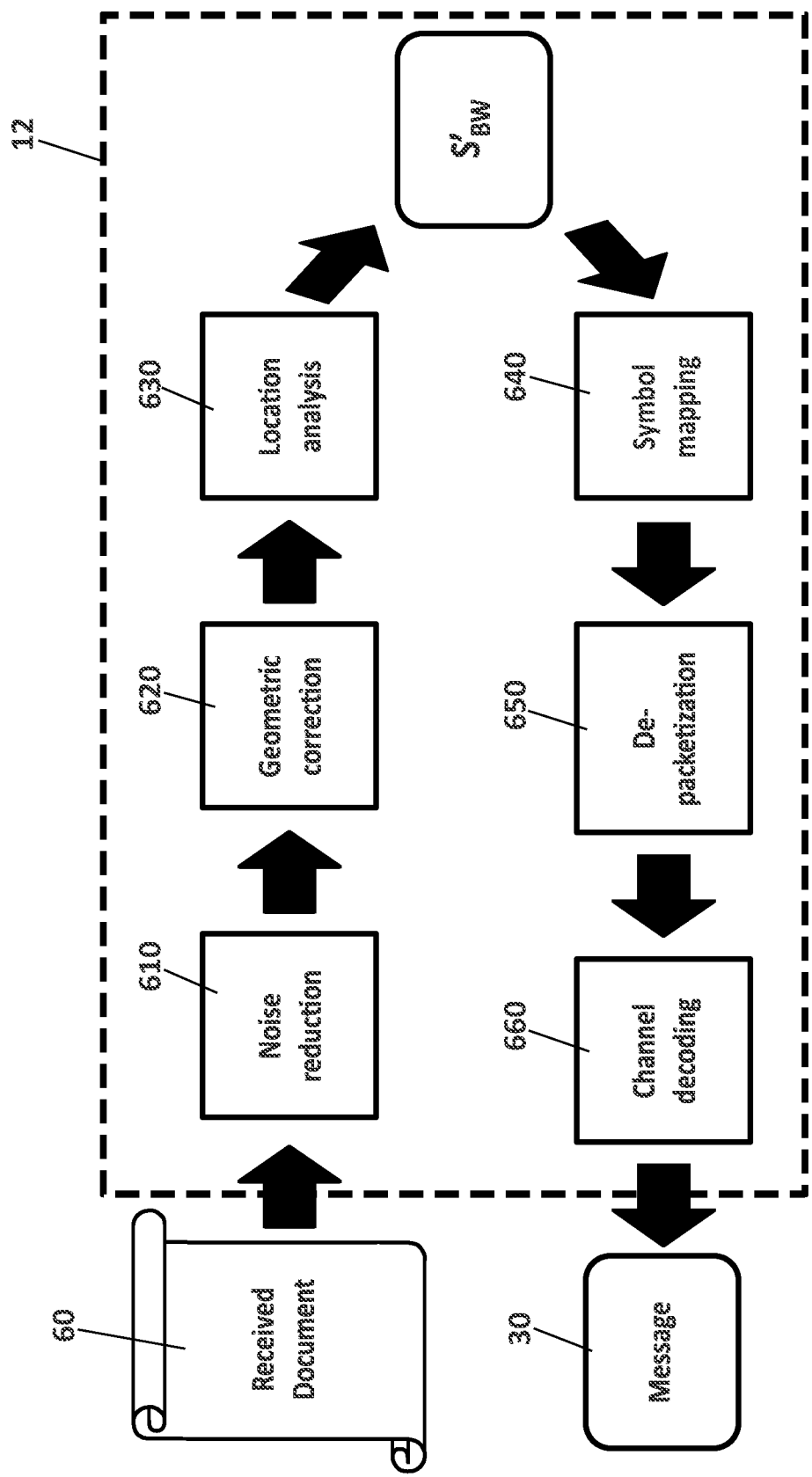
FIG. 6 shows a detailed block diagram of the method for watermarking extraction, according to another possible embodiment of the invention.

The reverse method (12) for extracting the embedded message from the watermarked document (20) is shown in FIG. 6. Once a document is received (60), certain operations must be performed to recover the embedded watermarked. The received document (60) may have been undergoing a series of transformations since its creation as a watermarked document (20), including printing and/or scanning, eventually introducing distortions to it, which must be taken into account in the decoding process. As such, the first step of the watermark extraction method (12) consists of noise reduction (610) and geometric correction (620), e.g., rotation, scaling and perspective transformation. General distortions include dirt, blurring and non-uniform shading, which can be removed by applying binarization methods and morphological operations over the received document (60). The main goal of the noise reduction (610) process is to clean the spaces between words and letters. On the other hand, the main goal of the geometric correction (620) process is to apply the appropriate rotation to the received document so that lines result approximately horizontal to allow line and space detection. Standard de-skewing methods may be applied to achieve this goal, usually based on edge detection or transformations to detect the lines in the document and compute the rotation angle to be applied. The following step in the watermark extraction method (12) consists of a location analysis (630) similar to the location analysis (110) described in FIG. 3 for the watermarking method (11), in order to detect the location and size of the spaces in the document, where the watermark has been inserted. Spaces must then be classified into intra-word and inter-word spaces. If clustering methods are used for this classification, it must be taken into account that inter-word spaces in the received document (60) present two different lengths, differently than in the original document (10), due to the watermark embedding. Finally, as intra-word spaces do not contain watermark info, they are not relevant as output of this classification process, while the inter-word spaces are recorded in the corresponding vector $S'_{BW}$. As a further step, spaces in $S'_{BW}$ have to be mapped (640) to symbols according to the alphabet w previously defined and as follows:

As a first step of the symbol mapping (640), spaces are grouped in subsets of size P. The t-th subset of spaces $S'^t_{BW}$ will hence encode one symbol $w_i$, with $i \in \{1, \ldots, Q\}$. The estimation of the most likely symbol may be expressed as:

$$\hat{c} = \arg\max_{c \in \{1 \ldots Q\}} f(S'^t_{BW}|w_c)$$

being $f(S'^t_{BW}|w_c)$ the probability density function of $S'^t_{BW}$ conditions on $w_c$. In practice, a statistical estimation is hardly applicable since it implies the knowledge of the statistical distribution of $S'^t_{BW}$ and its parameters, which largely varies on the type of document and font, and requires a large P to have a statistically meaningful sample. As such, the mapping (640) of spaces into symbols is performed by relying only on the means of the observed sample. In fact, after embedding the codeword $w_c$ in $S'^t_B$, the mean of the sample $S'^t_{BW}$ has the form $\mu_k(1 + \lambda w_c(k))$, being $\mu_k$ the mean of $S'_B(k)$. Hence, the watermark spaces are distributed around Q centroids, so the embedded symbol can be estimated by vector quantization techniques, relying on various existing methods for such operation, including scalar manner. Note that, if a clustering method has been used in the location analysis (630), such classification may naturally be provided as a secondary output of such process.

As a next step, the mapping between $S'_{BWi}(k)$ and $w_i(k)$ is performed assigning to $\hat{w}_i(k)$ the values of +1 or −1 depending on the corresponding space classification as large or short, respectively. The estimated $\hat{w}_i(k)$ are arranged accordingly to the subset defined in the embedding phase and the resulting sequences are compared with the codewords in the alphabet. If $w_c$ is the most similar codeword, the symbol $\hat{c} \in \{1, \ldots, Q\}$ is selected.

The estimated symbols resulting from the mapping (640) are finally given as input to a de-packetization (650) step, which looks for the synchronization symbols and extracts the payload symbols. Finally, channel decoding (650) is applied into the payload symbols to extract the original message (30) which were embedded in the received watermarked document (60).

Note that in this text, the term "comprises" and its derivations (such as "comprising", etc.) should not be understood in an excluding sense, that is, these terms should not be interpreted as excluding the possibility that what is described and defined may include further elements, steps, etc.

The invention claimed is:

1. A method (11) for watermarking documents, receiving an original document (10) and a message (30) to obtain a watermarked document (20) embedding a watermark which encodes the received message (30), the method characterized by comprising:
   identifying and locating spaces in the original document (10) by a location analysis (110) module, the location analysis (110) distinguishing between intra-word spaces and inter-word spaces, and wherein the location analysis (110) comprises
   checking (401) whether the received original document (10) is a bitmap format document and if the original document (10) is in a non-bitmap format, converting (402) the original document (10) into a bitmap format document;

applying an image-based segmentation (403) to the bitmap format document to obtain a set of lengths and a set of locations of the spaces in the bitmap format document;

classifying (405) the identified and located spaces into intra-word spaces and inter-word spaces to obtain sets (406) of lengths of the intra-word and inter-word spaces, $S_S$ and $S_B$ respectively, and sets of locations of the intra-word and inter-word spaces, $L_S$ and $L_B$ respectively, of the original document (10);

minimizing an error probability corresponding to an interference between intra-word spaces and inter-word spaces in the watermarked document (20) by means of an optimization module (111), wherein the optimization module (111) determines a distance between the lengths of the intra-word and inter-word spaces, and wherein the optimization module (111) minimizes the error probability by:

obtaining a modified set of intra-word spaces, $S^*_S = \{S^*_{Si}\}$ where i denotes a line number of the original document (10) and $S^*_{Si}$ is equal to:

$\mu(i)+\varepsilon$ if $S_{Si} > \mu(i)+\varepsilon$, and $S_{Si}$ else;

where $\mu(i)$ is an average value of the length of the intra-word spaces $S_{Si}$ in the i-th line and $\varepsilon$ is a host-rejection parameter which is an adjustable parameter to increase the distance between the lengths of the intra-word and inter-word spaces;

obtaining a modified set of inter-word spaces, $S^*_B = \{S^*_{Bi}\}$ where i denotes a line number of the original document (10), where $S^*_{Bi} = \{S^*_{Bi}(k)\}$, $S^*_{Bi}(k)$ being the modified length of the k-th inter-word space of the i-th line and $S_{Bi}(k)$ being the original length of the k-th inter-word space of the i-th line of the original document (10), $S^*_S = \{S^*_{Si}(k)\}$, $S^*_{Si}(k)$ being the modified length of the k-th intra-word space of the i-th line and $S_{Si}(k)$ being the original length of the k-th intra-word space of the i-th line of the original document (10), and $S^*_{Bi}(k) = S_{Bi}(k) + (\Sigma_k S_{Si}(k) - \Sigma_k S^*_{Si}(k))/N_b(i)$ $N_b(i)$ being the number of inter-word spaces in the i-th line of the original document (10);

encoding (113) the message (30) into codewords and encoding (114) the codewords into the watermark;

embedding the watermark into the original document (10) to generate (115) the watermarked document (20) by modifying the intra-word spaces and inter-word spaces of the original document (10) according to the encoding (113) of the received message (30), wherein generating (115) the watermarked document (20) comprising:

selecting a subset from the set of inter-word spaces, $S^*_B$, mapped to the set of inter-word spaces in the t-th line, $S^t_B$, through a secret key;

selecting a codeword $w_t$ from the encoded message (30) embedding the selected codeword $w_t$ in the selected subset of inter-word spaces by calculating a modified inter-word space $S_{BW}$ of the watermarked document (20) using the expression:

$S^t_{BW}(k) = S^t_B(k) + w_t(k) \cdot c_t(k) \cdot S^t_B(k) = S^t_B(k)(1 + w_t(k) \cdot c_t(k))$ where $w_t(k)$ is the selected codeword, for the k-th inter-word space in the t-th line; $S^t_B(k)$ is the k-th inter-word space in the t-th line of the inter-word space $S_B$ of the original document (10), $S^t_{BW}(k)$ is the k-th inter-word space in the t-th line of the inter-word space $S_{BW}$ of the watermarked document (20) and $c_t(k)$ is a weighting factor; and modifying the intra-word spaces and inter-word spaces of the original document (10) replacing the intra-word space, $S_S$, and the inter-word space, $S_B$, respectively by the modified set of intra-word spaces, $S^*_S$, and the modified inter-word space, $S_{BW}$, in the watermarked document (20).

2. The method according to claim 1, wherein the image-based segmentation (403) applies clustering or optical character recognition if the received original document (10) has a non-homogeneous text background.

3. The method according to claim 1, wherein the image-based segmentation (403) applies projections if the received original document (10) has a homogeneous text background.

4. The method according to claim 1, wherein encoding (113) the message (30) of length K comprises adding a channel coding to the message (30) to obtain a modified message (m') of length L>K, dividing the modified message (m') into payload blocks (510, 510') of length N and adding a synchronization block (520, 520') of length T before each payload block (510, 510') respectively to obtain a symbol sequence (m") of length L·(1+T/N).

5. The method according to claim 1, wherein the original document (10) is selected from a digital document and a digitalized document.

6. A non-transitory computer-readable medium containing computer instructions stored therein for causing a computer processor to perform the method according to claim 1.

* * * * *